US009428650B2

(12) United States Patent
Meschter et al.

(10) Patent No.: US 9,428,650 B2
(45) Date of Patent: Aug. 30, 2016

(54) ENVIRONMENTAL BARRIER COATINGS AND METHODS THEREFOR

(71) Applicant: General Electric Company, Schenectady, NY (US)

(72) Inventors: Peter Joel Meschter, Niskayuna, NY (US); Curtis Alan Johnson, Niskayuna, NY (US); Sairam Sundaram, Niskayuna, NY (US); Julin Wan, Rexford, NY (US); Don Mark Lipkin, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 830 days.

(21) Appl. No.: 13/711,250

(22) Filed: Dec. 11, 2012

(65) Prior Publication Data
US 2014/0162027 A1    Jun. 12, 2014

(51) Int. Cl.
*F01D 5/28* (2006.01)
*C04B 41/89* (2006.01)
*C04B 41/52* (2006.01)
*C09D 5/00* (2006.01)
(Continued)

(52) U.S. Cl.
CPC ............... *C09D 5/00* (2013.01); *C04B 41/009* (2013.01); *C04B 41/52* (2013.01); *C04B 41/89* (2013.01); *C23C 28/042* (2013.01); *F01D 5/288* (2013.01); *Y10T 428/24612* (2015.01)

(58) Field of Classification Search
CPC ......... B32B 3/00; B32B 3/30; C23C 28/042; F01D 5/288; F01D 5/286; C04B 41/89; C04B 41/009; C04B 41/52; Y10T 428/24612

USPC .......................... 428/156, 161, 164, 172, 446
See application file for complete search history.

(56) References Cited

U.S. PATENT DOCUMENTS 5,419,971 A * 5/1995 Skelly ....................... C23C 4/02
                                                      428/161
6,296,941 B1 10/2001 Eaton, Jr. et al.
(Continued)

FOREIGN PATENT DOCUMENTS

EP    1044943 A1    10/2000
EP    1044944 A1    10/2000
(Continued)

OTHER PUBLICATIONS

B. Tryon et al., "Hybrid intermetallic Ru/Pt-modified bond coatings for thermal barrier systems," Science Direct, Surface & Coatings Technology, vol. 202, 2007, pp. 349-361.
(Continued)

*Primary Examiner* — Catherine A Simone
(74) *Attorney, Agent, or Firm* — John P. Darling

(57) ABSTRACT

An article includes a silicon-containing region including surface features on a surface thereof. The surface features include depressions, protuberances, or combinations thereof. At least one outer layer overlies the surface of the silicon-containing region. A constituent layer is provided on the surface of the silicon-containing region and between and contacting the silicon-containing region and the at least one outer layer. The constituent layer is formed by constituents of the silicon-containing region and is susceptible to creep within an operating environment of the article. The surface features physically interlock the at least one outer layer with the silicon-containing region through the constituent layer.

16 Claims, 1 Drawing Sheet

(51) Int. Cl.
*C23C 28/04* (2006.01)
*C04B 41/00* (2006.01)

(56) References Cited

U.S. PATENT DOCUMENTS

| | | | |
|---|---|---|---|
| 6,299,988 | B1 | 10/2001 | Wang et al. |
| 6,361,878 | B2 | 3/2002 | Ritter et al. |
| 6,410,148 | B1 | 6/2002 | Eaton, Jr. et al. |
| 6,444,331 | B2 | 9/2002 | Ritter et al. |
| 6,544,665 | B2 | 4/2003 | Rigney et al. |
| 6,630,200 | B2 | 10/2003 | Wang et al. |
| 6,726,444 | B2 | 4/2004 | Zhao et al. |
| 6,902,836 | B2 | 6/2005 | Eaton et al. |
| 7,056,574 | B2 | 6/2006 | Ojard et al. |
| 7,150,921 | B2 | 12/2006 | Nelson et al. |
| 7,442,444 | B2 * | 10/2008 | Hazel .............. C04B 35/16 416/241 R |
| 7,704,596 | B2 | 4/2010 | Merrill et al. |
| 2010/0047615 | A1 | 2/2010 | Carter et al. |
| 2010/0189911 | A1 | 7/2010 | Berczik et al. |
| 2010/0236759 | A1 | 9/2010 | Wadley et al. |
| 2011/0027557 | A1 * | 2/2011 | Kirby .............. C04B 41/009 428/215 |
| 2011/0033284 | A1 | 2/2011 | Tryon et al. |
| 2011/0097538 | A1 * | 4/2011 | Bolcavage .......... F01D 5/288 428/137 |
| 2013/0122259 | A1 | 5/2013 | Lee |

FOREIGN PATENT DOCUMENTS

| | | |
|---|---|---|
| EP | 2615250 A1 | 7/2013 |
| WO | 9943861 | 9/1999 |
| WO | 9958472 A2 | 11/1999 |
| WO | 2010123602 A1 | 10/2010 |
| WO | 2012122373 A1 | 9/2012 |
| WO | 2014092916 A1 | 6/2014 |

OTHER PUBLICATIONS

B. Tryon et al., "Multilayered Ruthenium-Modified Bond Coats for Thermal Barrier Coatings," Metallurgical and Materials Transactions A, vol. 37A, Nov. 2006, pp. 3347-3358.

PCT Search Report and Written Opinion dated Feb. 24, 2014 issued in connection with corresponding PCT Application No. PCT/US2013/069833.

Ma Sichun, Fundamentals of Material Science the first edition; pp. 1-3.

Unofficial English translation of Chinese Office Action and Search Report issued in connection with the corresponding application No. 201380064866.2 on Mar. 31, 2016.

* cited by examiner

ENVIRONMENTAL BARRIER COATINGS AND METHODS THEREFOR

BACKGROUND OF THE TECHNOLOGY

The present technology generally relates to coating systems and methods suitable for protecting components exposed to high-temperature environments, such as the hostile thermal environment of a turbine engine. More particularly, this technology is directed to an environmental barrier coating (EBC) on a silicon-containing region of a component and to the incorporation of surface features in the silicon-containing region to inhibit creep displacement of the EBC when subjected to shear loading at elevated temperatures.

Higher operating temperatures for turbine engines are continuously sought in order to increase their efficiency. Though significant advances in high temperature capabilities have been achieved through formulation of iron, nickel and cobalt-base superalloys, alternative materials have been investigated. Ceramic composite materials are being developed for such high temperature applications as combustor liners, vanes, shrouds, blades, and other hot section components of turbine engines. Some examples of composite materials include silicon-based composites, for example, composite materials in which silicon, silicon carbide (SiC), silicon nitride ($Si_3N_4$), and/or a metal silicide serves as a reinforcement phase and/or a matrix phase.

In many high temperature applications, a protective coating is beneficial or required for a Si-containing material. Such coatings should provide environmental protection by inhibiting the formation of volatile silicon hydroxide (for example, $Si(OH)_4$) products and, desirably, preventing ingress of water vapor to the oxidizing surface. A coating system having these functions will be referred to below as an environmental barrier coating (EBC) system. Desirable properties for the coating material include a coefficient of thermal expansion (CTE) compatible with the Si-containing substrate material, low permeability for oxidants, low thermal conductivity, low silica chemical activity and chemical compatibility with the underlying Si-containing material and thermally grown silica scale.

The silicon content of a silicon-containing bondcoat reacts with oxygen and/or water vapor at high temperatures to form an oxide product, predominantly an amorphous silica ($SiO_2$) scale, though a fraction of the oxide product may be crystalline silica or the (solid or gaseous) oxides of other constituents of the bondcoat. The amorphous silica product exhibits low oxygen permeability. As a result, the silica product that thermally grows on the bondcoat is able to form a protective barrier layer that deters permeation of oxygen into the substrate.

BRIEF DESCRIPTION OF THE TECHNOLOGY

The amorphous silica product that forms on a silicon-containing bondcoat in service has a relatively low viscosity and consequently a high creep rate under shear loading at the operating temperatures. High shear loads can be imposed by g forces resulting from rotation of parts, such as blades (buckets) of turbine engines. Such shear loading may cause creep displacements of the EBC relative to the substrate, which can result in severe EBC damage and even direct loss of EBC protection of the underlying substrate.

The present technology provides an environmental barrier coating (EBC) system and a method of fabricating the EBC system on an article formed of a silicon-containing material, such as a ceramic matrix composite (CMC) in which a silicon-containing material serves as a reinforcement phase and/or a matrix phase. The EBC system and method are particularly well suited for protecting silicon-containing articles exposed to high temperatures, including the hostile thermal environment of a turbine engine.

According to one aspect of the technology, an article comprises a silicon-containing region comprising surface features on a surface thereof, the surface features comprising depressions, protuberances, or combinations thereof; at least one outer layer overlying the surface of the silicon-containing region; and a constituent layer on the surface of the silicon-containing region and between and contacting the silicon-containing region and the at least one outer layer, the constituent layer being formed by oxidation of constituents of the silicon-containing region and being susceptible to creep within an operating environment of the article, the surface features physically interlocking the at least one outer layer with the silicon-containing region through the constituent layer.

According to another aspect of the technology, a method of coating a silicon-containing region of an article comprises forming surface features on a surface of the silicon-containing region, the surface features comprising depressions, protuberances, or combinations thereof; forming at least one outer layer overlying the surface of the silicon-containing region; and forming a constituent layer on the surface of the silicon-containing region between the silicon-containing region and the at least one outer layer, the constituent layer being formed by oxidation of constituents of the silicon-containing region and being susceptible to creep within an operating environment of the article, and the surface features physically interlocking the at least one outer layer with the silicon-containing region through the constituent layer.

By interlocking the silicon-containing region with a first layer of the environmental barrier coating system, displacement of the EBC attributable to creep of the constituent layer, for example, a silica layer that thermally grows on the silicon-containing region, can be substantially inhibited, thereby promoting the structural integrity of the environmental barrier coating system and its ability to protect the article in high temperature applications. The technology is applicable to use with known environmental barrier coating materials, and the interlocking features can be produced using various additive and subtractive processes.

BRIEF DESCRIPTION OF THE DRAWINGS

Other aspects and advantages of this technology will be better appreciated from the following detailed description with reference to the drawings, in which.

DETAILED DESCRIPTION OF THE TECHNOLOGY

The present technology is generally applicable to components that operate within environments characterized by high temperatures, thermal cycling, thermal and mechanical stresses, and oxidation. Examples of such components include high and low pressure turbine vanes (nozzles) and blades (buckets), shrouds, combustor liners, augmentor hardware, and other hot section components of turbine engines, though the technology has application to other components. Most notable, the present technology is applicable to rotating components of turbine engines, such as blades (buckets).

Figure 1:
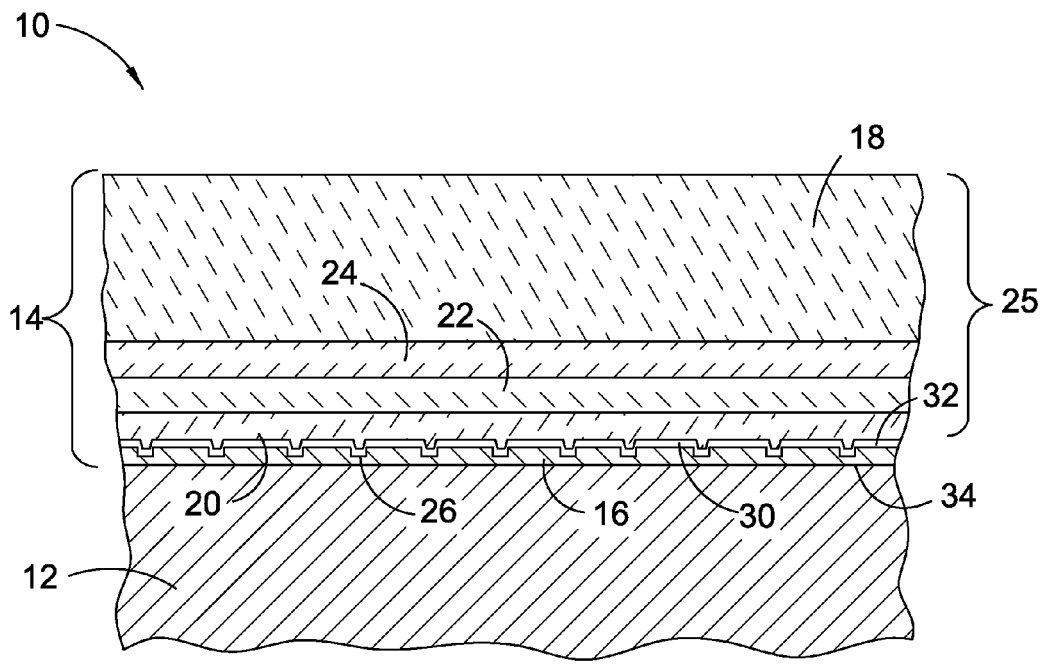
FIG. 1 schematically represents an EBC system containing a bondcoat whose surface is configured to have a regular distribution of surface features in accordance with an example of the present technology.
Figure 2:
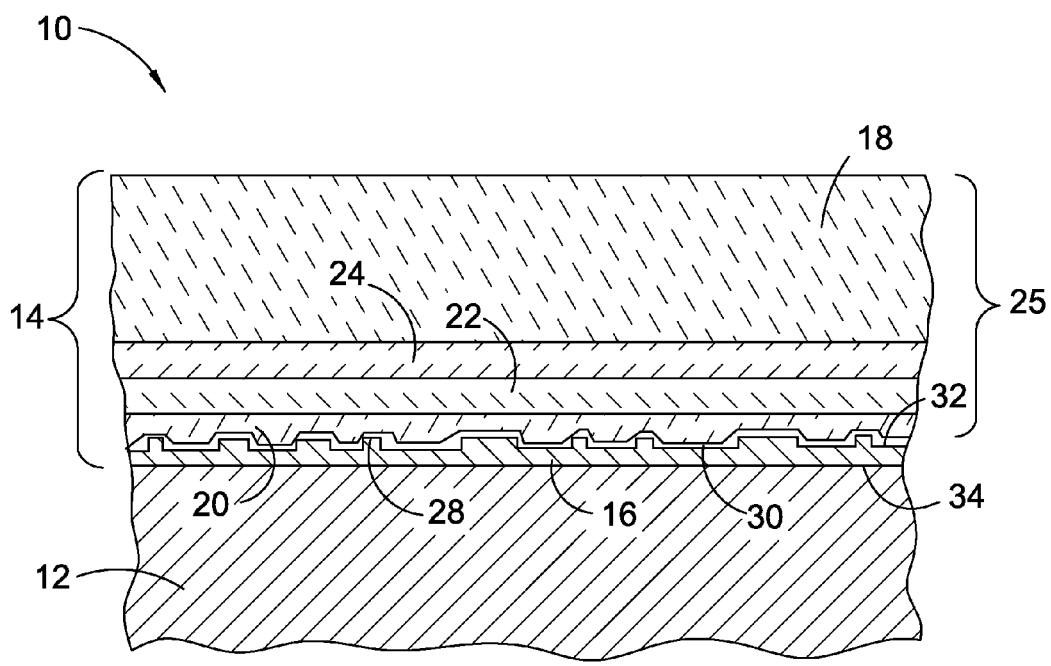
FIG. 2 schematically represents an EBC system containing a bondcoat whose surface is configured to have an irregular distribution of surface features in accordance with another example of the present technology.

Multilayer environmental barrier coating (EBC) systems 14 in accordance with examples of this technology are schematically represented in FIGS. 1 and 2 as protecting a substrate 12 of a component or article 10. The substrate 12 may include a silicon-containing region. Examples of silicon-containing materials include those with a silicon carbide, silicon nitride, a silicide (for example, a refractory metal or transition metal silicide, including, but not limited to, for example Mo, Nb, or W silicides) and/or silicon as a matrix or second phase. Further examples include ceramic matrix composites (CMC) that contain silicon carbide as the reinforcement and/or matrix phase.

The EBC systems 14 of FIGS. 1 and 2 represent one of a variety of different EBC systems that can incorporate a silicon-containing bondcoat 16, shown in FIGS. 1 and 2 as being directly applied to a surface 34 of the substrate 12. An example of a silicon-containing bondcoat is disclosed in, for example, U.S. Pat. No. 6,299,988. The bondcoat 16 is further represented as bonding a first EBC layer 20 to the substrate 12, and optionally at least one additional layer 22, 24, 18 of the EBC system 14. The EBC system 14 is intended to provide environmental protection to the underlying substrate 12, as well as to potentially reduce the operating temperature of the component 10, thereby enabling the component 10 to operate at higher gas temperatures than otherwise possible. While FIGS. 1 and 2 represent the EBC system 14 as including the silicon-containing bondcoat 16, in which case the first EBC layer 20 is deposited directly on a silicon-containing surface region formed by the bondcoat 16, the technology is also applicable to an EBC system 14 that does not include a bondcoat 16 as described herein, in which case the first EBC layer 20 is deposited directly on a silicon-containing surface region formed by the substrate 12. It should be appreciated that a constituent layer 30, or a portion of the constituent layer 30, described in more detail below, may be present prior to application of the first EBC layer 20.

Degradation of a silicon-containing material in a combustion environment results in reaction with water vapor to form volatile silicon hydroxide (for example, $Si(OH)_4$) products. The EBC layers 25, hereafter referred to as EBC, may serve to resist recession by chemical reaction of the bondcoat 16 and/or substrate 12 with water vapor, provide a temperature gradient to reduce the operating temperature of the component 10, or both. Suitable EBC's usable with the present technology include, but are not limited to, those disclosed in, for example, U.S. Pat. No. 6,296,941 and U.S. Pat. No. 6,410,148. The EBC may perform a multitude of sealing, reaction barrier, recession resistance, and/or thermal barrier functions.

As noted above, each of the bondcoat 16 and substrate 12 may define a surface region of the component 10 that contains silicon. For example, the bondcoat 16 may comprise or consist essentially of elemental silicon. Alternatively, the bondcoat 16 may contain silicon carbide, silicon nitride, metal silicides, elemental silicon, silicon alloys, or mixtures thereof. Bondcoat 16 may further contain oxide phases, such as silica, rare earth silicates, rare earth aluminosilicates, and/or alkaline earth aluminosilicates. The use of silicon-containing compositions for the bondcoat 16 improves oxidation resistance of the substrate 12 and enhances bonding between the substrate 12 and first EBC layer 20. For this purpose, a thickness of the bondcoat 16 may be, for example, about 25 to about 350 μm, for example about 50 to about 250 μm, for example about 100 to 200 μm, for example about 125 to 175 μm, for example about 150 μm. The silicon of the bondcoat 16 reacts with oxygen at elevated temperatures to thermally grow a constituent layer 30 of predominantly amorphous silica ($SiO_2$) on its surface 32, as schematically represented in FIGS. 1 and 2. The resulting amorphous silica exhibits low oxygen permeability. As a result, along with the silicon-containing bondcoat 16, the constituent layer 30 is able to deter permeation of oxygen into the bondcoat 16 and substrate 12. During growth of the constituent layer, some of the amorphous silica may crystallize into crystalline silica.

The constituent layer 30 may have a composition other than pure silica, yet contain silica as a constituent derived from oxidation of the bondcoat 16. For example, the constituent layer 30 may contain other elements in solution, such as, but not limited to, boron, aluminum, and/or nitrogen. The constituent layer 30 may also contain other phases, such as yttrium aluminosilicate (YAS) or rare earth disilicate (REDS). The various possible compositions for the constituent layer 30 may be derived at least in part from the composition of the bondcoat 16.

In the absence of the silicon-containing bondcoat 16, the first layer 20 of the EBC 25 can be deposited directly on a silicon-containing surface region of the component 10 defined by the substrate 12, in which case the substrate 12 is formed to have a composition whose silicon content is sufficient to react with oxygen at elevated temperatures and form a protective silica constituent layer 30 described above. Furthermore, depending on the composition of the substrate 12, this layer may be a predominantly amorphous silica product, a silica-rich glass, or a multi-phase mixture wherein one of the phases is silica-rich. As a matter of convenience, the remaining disclosure will make reference to embodiments that include the bondcoat 16 as represented in FIGS. 1 and 2, though the disclosure should be understood to equally apply to a constituent layer 30 that forms on the surface 34 of the substrate 12.

The constituent layer 30 that forms on the silicon-containing bondcoat 16 (or another silicon-containing surface region, such as the substrate 12) during high temperature service may grow to thicknesses of up to about 50 μm or more, depending on the application. The constituent layer 30 may have a relatively low viscosity and consequently a high creep rate under shear loading that can be imposed by g forces that occur in rotating parts, such as blades (buckets) of turbine engines. As a result of creep of the constituent layer 30, displacements of the overlying EBC 25 relative to the substrate 12 can exceed 100 mm over 25,000 hours service at about 1315° C. (about 2400° F.). Such large creep displacements can result in severe damage to the EBC system 14 and direct loss of environmental protection of the underlying substrate 12.

Creep of the constituent layer 30 that forms on the surface 32 of the silicon-containing bondcoat 16 (or, in the absence of the bondcoat 16, on the surface 34 of the substrate 12) may be inhibited by making the surface 32 of the bondcoat 16 to contain surface features, schematically represented in FIGS. 1 and 2 in the form of depressions (recesses) 26 and/or protuberances (protrusions) 28, respectively. While the depressions 26 and protuberances 28 are represented in FIGS. 1 and 2 as being only on the surface 32 of the bondcoat 16, it should be appreciated that similar surface features may be provided at the surface of the substrate 12.

To provide the desired interlocking effect at the interface between the bondcoat 16 and an overlying layer 20 of the EBC system 14, the surface features preferably extend from the bondcoat surface 32 by a thickness about equal to or greater than that of the constituent layer 30 that grows on the surface 32 over the service interval of component 10. For this purpose, the surface features 26, 28 may extend from or into the surface 32 of the bondcoat 16 by, for example, about 10 to about 200 µm, for example about 40 to about 160 µm, for example about 80 to about 120 µm, for example about 100 µm, though the dimensions may depend on the maximum anticipated thickness of the constituent layer 30 and other factors associated with the particular application. For example, depressions 26 having a mean depth of about 50 to about 100 µm may be effective, and protuberances 28 having a mean height of about 50 to about 100 µm may be effective.

Lateral dimensions for the depressions 26 and protuberances 28 may depend on the allowable displacement that the EBC 25 may experience as a result of creep of the constituent layer 30. The relative displacement of the EBC 25 will be limited by the depths and lateral dimensions of the depressions 26 and/or the heights of and mean distances between the protuberances 28. Therefore, although lateral dimensions for the depressions 26 and protuberances 28 may depend on the particular composition and construction of the EBC system 14 and the particular application of the component 10 protected by the EBC system 14, lateral dimensions may be from a minimum of about 10 µm to a maximum of about equivalent to the dimensions of the article 10. The depressions 26 and/or protuberances 28 may be of the same size and shape (homogeneous or uniform) as shown in FIG. 1 or may have different sizes and/or shapes (heterogeneous or irregular) as shown in FIG. 2. Potential shapes for the depressions 26 and protuberances 28 include, but are not limited to, rectilinear shapes such as squares, rectangles and triangles and curvilinear shapes such as circles and ovals. Such depressions 26 and protuberances 28 may be discontinuous or continuous and defined by square waves, sine or random waves, tapered trenches, and irregular surface roughness generated as a result of the process by which the bondcoat 16 is deposited.

The depressions 26 and/or protuberances 28 may be arranged to define a uniform or regular (homogeneous) array or pattern as represented by the depressions 26 of FIG. 1, or arranged to define a non-uniform or irregular (heterogeneous) distribution or pattern as represented by the protuberances 28 of FIG. 2, or a combination of both. As a uniform pattern, the depressions 26 and/or protuberances 28 may be roughly equally spaced from each other and may have roughly equal dimensions, whereas an irregular pattern may be characterized by depressions 26 and/or protuberances 28 that are unequally spaced from each other and/or have unequal dimensions. Suitable spacing between adjacent surface features 26/28 may be at least about 10 µm, with more preferred ranges being about 20 to about 2000 µm and particularly about 50 to about 1000 µm. Densities for the depressions 26 and/or protuberances 28, as measured by discrete surface features per square centimeter of surface area of the bondcoat 16, may depend in part on the height/depth, shape and/or lateral dimensions of the surface features and the operating environment (e.g time, temperature and shear stress) of component 10.

The depressions 26 and/or protuberances 28 may be formed during or following the deposition of the bondcoat 16 and prior to the deposition of the first layer 20. The depressions 26 and/or protuberances 28 may be fabricated by various processes. For example, depressions 26 can be produced by various material removal (subtractive) methods, such as but not limited to grit blasting, chemical etching, plasma etching, and laser machining, and protuberances 28 may be produced by material deposition (additive) methods, such as chemical vapor deposition (CVD), ion plasma deposition (IPD), and thermal spraying. Sizes and distributions of depressions 26 and/or protuberances 28 may be controlled by suitable methods, such as masking.

The depressions 26 and/or protuberances 28 on the bondcoat 16 provide a means by which the constituent layer 30 that grows on the bondcoat 16 and a first EBC layer 20 deposited on the bondcoat 16 may be physically interlocked with the bondcoat 16, even as the constituent layer 30 continues to grow on the surface 32 of the bondcoat 16, including within its depressions 26 and/or over its protrusions 28. The depressions 26 and/or protuberances 28 on the bondcoat 16 limit displacement of the constituent layer 30 and, therefore, the relative displacement of the EBC 25. By interlocking the bondcoat 16 and a layer deposited on the bondcoat 16 through the constituent layer 30, the depressions 26 and/or protuberances 28 are able to inhibit long-range sliding of the EBC 25 that can occur with respect to the bondcoat 16 and substrate 12 if the surface 32 of the bondcoat 16 were microscopically smooth, particularly if the component 10 is a rotating component, such as a bucket/blade of a turbine engine. If not inhibited by the depressions 26 and/or protuberances 28, such sliding would cause cracking and spalling of the overlying EBC 25 with subsequent loss of the environmental protection provided by the multilayer EBC system 14. In an extreme case, loss of the EBC system 14 over large surface regions of the component 10 can lead to rapid environmental degradation and ultimate failure of the component 10.

While the technology has been described in terms of the disclosed examples, it should be appreciated that other forms could be adopted by one skilled in the art. Therefore, the scope of the inventions is to be limited only by the following claims.

The invention claimed is:

1. An article, comprising:
   a ceramic matrix composite substrate comprising a continuous surface;
   a bondcoat overlying the continuous surface of the substrate, the bondcoat being formed of a material containing elemental silicon; one or more silicon alloys; silicon carbide; silicon nitride; transition metal silicides; silica; rare earth silicates; rare earth aluminosilicates; alkaline earth aluminosilicates; and mixtures thereof, the bondcoat comprising surface features, the surface features comprising depressions, protuberances, or combinations thereof
   at least one outer layer overlying the bondcoat and the continuous surface of the substrate; and
   a constituent layer on the bondcoat and between and contacting the bondcoat and the at least one outer layer, the constituent layer being formed by constituents of the bondcoat and being susceptible to creep deformation within an operating environment of the article, the constituent layer comprising surface features corresponding to the surface features of the bondcoat, and the surface features physically interlocking the at least one outer layer with the bondcoat through the constituent layer, wherein the surface features extend from or into the surface of the bondcoat by about 40 to about 160 µm.

2. The article according to claim 1, wherein the surface features are regularly spaced from each other and have substantially equal dimensions.

3. The article according to claim 1. wherein the surface features define an irregular pattern in which the surface features are not equally spaced from each other and/or have unequal dimensions.

4. The article according to claim 1, wherein the surface features have lateral dimensions of at least about 10 μm.

5. The article according to claim 1, wherein the surface features are spaced apart at least about 10 μm.

6. The article according to claim 1, wherein the surface features have lateral dimensions greater along an axis perpendicular to a shear direction of the constituent layer than parallel to the shear direction of the constituent layer.

7. The article according to claim 1, wherein the surface features are from the group of rectilinear shapes, curvilinear shapes, and irregular surface roughness.

8. The article according to claim 1, wherein the bondcoat consists essentially of elemental silicon.

9. The article according to claim 1, wherein the bondcoat consists of silicon with one or more additional compounds chosen from the group consisting of silicon carbide and silicon nitride, transition metal suicide and silica.

10. The article according to claim 1, wherein the at least one outer layer contains:

mullite; an alkaline earth aluminoslicate; a RE silicate of the formula $RE_2SiO_5$ or $RE_2Si_2O_7$;

alkaline earth aluminosilicates; RE oxides; RE aluminosilicate; and mixtures thereof, wherein RE is Sc, Y, Dy, Ho, Er, Tm, Yb, Lu, Eu, Gd, Tb, or combinations thereof.

11. The article according to claim 1. wherein the substrate contains silicon carbide. silicon nitride, and/or silicon as a reinforcement phase and/or a matrix, phase.

12. The article according to claim 11, wherein the substrate contains silicon carbide as a reinforcement phase and/or a matrix phase.

13. The article according to claim 1, wherein the constituent layer comprises amorphous silica, a silica-rich glass, or a multi-phase mixture including at least one amorphous silica or silica-rich glass phase.

14. The article according to claim 1, wherein the article is a rotating component of a turbine engine.

15. The article according to claim 13, wherein the constituent layer contains, in solution, boron, aluminum, and/or nitrogen.

16. The article according to claim 13, wherein the multi-phase mixture further comprises ytrrium aluminosilicate or rare earth disilicate.

* * * * *